(12) United States Patent
Kang et al.

(10) Patent No.: US 9,841,891 B2
(45) Date of Patent: Dec. 12, 2017

(54) MOBILE TERMINAL AND METHOD OF CONTROLLING THE SAME

(71) Applicant: LG ELECTRONICS INC., Seoul (KR)

(72) Inventors: Youngchang Kang, Seoul (KR); Giwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 14/668,688

(22) Filed: Mar. 25, 2015

(65) Prior Publication Data

US 2016/0011737 A1 Jan. 14, 2016

(30) Foreign Application Priority Data

Jul. 8, 2014 (KR) ........................ 10-2014-0085403

(51) Int. Cl.
*G06F 3/0481* (2013.01)
*G06F 3/0488* (2013.01)
*G06F 17/30* (2006.01)

(52) U.S. Cl.
CPC ........ *G06F 3/0488* (2013.01); *G06F 3/04883* (2013.01); *G06F 3/04886* (2013.01); *G06F 17/30014* (2013.01); *G06F 2203/04101* (2013.01)

(58) Field of Classification Search
CPC .. G06F 3/0488; G06F 3/04883; G06F 3/0484; G06F 3/017; G06F 3/04817
See application file for complete search history.

(56) References Cited

U.S. PATENT DOCUMENTS

| | | | |
|---|---|---|---|
| 8,478,777 B2 * | 7/2013 | Li | G06F 17/30967 707/769 |
| 8,839,087 B1 * | 9/2014 | Hayden | G06F 17/30412 715/204 |
| 2012/0197857 A1 * | 8/2012 | Huang | G06F 3/0488 707/706 |

* cited by examiner

*Primary Examiner* — Namitha Pillai
(74) *Attorney, Agent, or Firm* — Lee, Hong, Degerman, Kang & Waimey

(57) ABSTRACT

Disclosed are a mobile terminal and a method of controlling the same. The mobile terminal includes a display unit configured to display a content screen and a control unit configured to change an output state of the content screen with respect to a point from which a first touch gesture starts, in response to that the first touch gesture is sensed in the content screen, and when the first touch gesture which is continuously sensed in the content screen corresponds to a predetermined reference, perform control to search for other content associated with at least one piece of information extracted from the content screen.

20 Claims, 16 Drawing Sheets

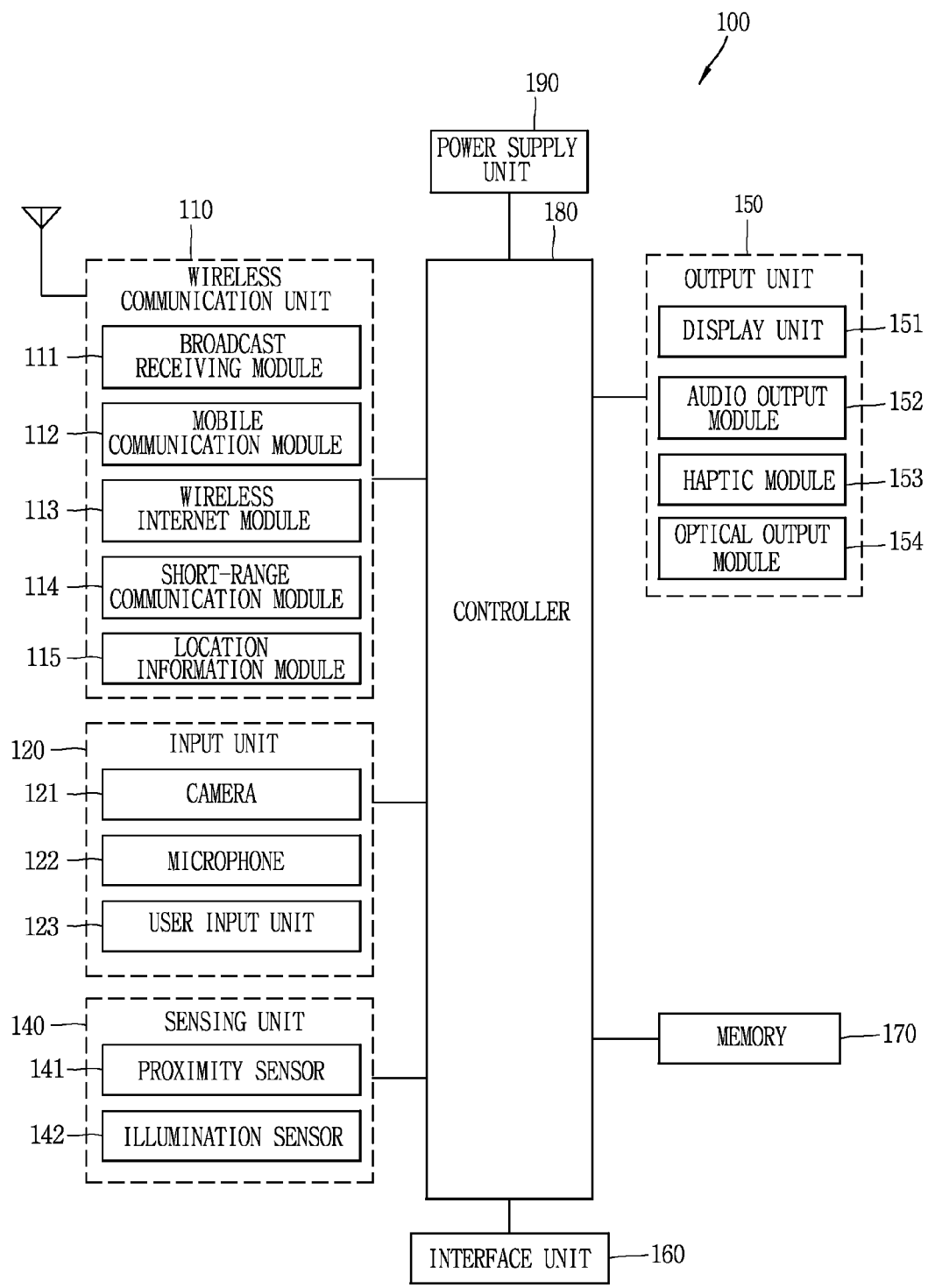

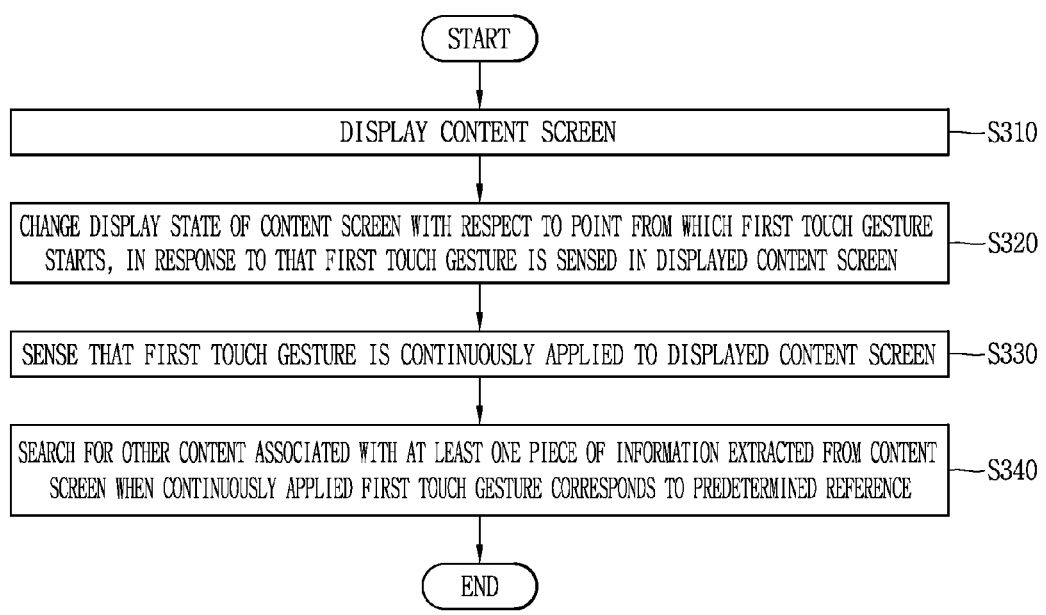

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0085403, filed on Jul. 8, 2014, the contents of which is incorporated by reference herein in its entirety.

BACKGROUND OF THE DISCLOSURE

1. Field of the Disclosure

The present disclosure relates to a mobile terminal and a method of controlling the same, which display at least one piece of content on a screen.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

Efforts are ongoing to support and increase the functionality of mobile terminals. Such efforts include software and hardware improvements, as well as changes and improvements in the structural components.

When a user desires to receive, by using a mobile terminal, other information associated with an interesting part in a content screen which the user is looking at, the user itself recognizes the interesting part in the content screen which is displayed, extracts a keyword, and intentionally performs a separate input for searching for the keyword. Also, manipulation should be performed for the search a plurality of times, and there is a difficulty in that a content screen which is currently seen is converted into a search screen, used to search for relevant information, or a screen corresponding to a search result.

SUMMARY OF THE DISCLOSURE

Therefore, an aspect of the detailed description is to provide a mobile terminal and a method of controlling the same, which enable information, associated with a part which a user interestingly looks at, to be naturally searched.

Another an aspect of the detailed description is to provide a mobile terminal and a method of controlling the same, which enable information, associated with a part which a user interestingly looks at, to be searched without converting a currently output screen.

To achieve these and other advantages and in accordance with the purpose of this specification, as embodied and broadly described herein, a mobile terminal includes: a display unit configured to display a content screen; and a control unit configured to change an output state of the content screen with respect to a point from which a first touch gesture starts, in response to that the first touch gesture is sensed in the content screen, and when the first touch gesture which is continuously sensed in the content screen corresponds to a predetermined reference, perform control to search for other content associated with at least one piece of information extracted from the content screen.

In an embodiment, the first touch gesture corresponding to the predetermined reference may be a pinch-out touch gesture which is continuously sensed in the display unit, in a state where the output state of the content screen is no longer changed in response to that the pinch-out touch gesture is sensed in the content screen.

In an embodiment, when the first touch gesture corresponds to the predetermined reference, the control unit may perform control to extract at least some of visual information which is within a certain range with respect to the point from which the first touch gesture starts.

In an embodiment, when the first touch gesture corresponds to the predetermined reference, the control unit may execute search in background while maintaining the output state of the content screen, and control the display unit so that an image object, indicating execution of the search while the search is being executed, is displayed to be overlapped on the content screen.

In an embodiment, when a second touch gesture is sensed in the display unit in a state where the image object is displayed, the control unit may stop the search, and perform control so that the image object disappears from the display unit.

In an embodiment, the control unit may display, in the display unit, a second screen which is generated by enlarging the content screen with respect to a start point of the first touch gesture in proportion to that the first touch gesture is continuously sensed in the content screen, and when the first touch gesture is continuously sensed in a state where the second screen is no longer enlarged, the control unit may execute a search function using at least one piece of information, included in the second screen, as a keyword.

In an embodiment, when a first touch gesture, corresponding to the predetermined reference, being terminated is sensed, the control unit may pop up an icon, corresponding to an execution result of the search, onto one region of the display unit.

In an embodiment, the control unit may perform control so that at least one of attribute information and number information of at least one piece of searched content is marked on the popped-up icon.

In an embodiment, when a plurality of searched content correspond to a plurality of categories, the control unit may classify the searched plurality of content by category to generate different icons, and pop up the generated different icons onto the display unit.

In an embodiment, when a touch is sensed in the popped-up icon, the control unit may convert the content screen, displayed by the display unit, into a screen corresponding to searched first content corresponding to the icon.

In an embodiment, in response to that a drag touch input which starts from one point of the converted screen corresponding to the first content is applied in predetermined one direction, the control unit may convert a current screen into a screen corresponding to searched second content corresponding to the icon.

In an embodiment, while the drag touch input which starts from the one point of the converted screen corresponding to the first content is being moved in the predetermined one direction, the control unit may perform control so that at least one portion of a screen corresponding to the searched first content and at least one portion of a screen corresponding to the searched second content are displayed together.

In an embodiment, while a screen corresponding to at least one of the first and second content is displayed in the display unit, the control unit may perform control to maintain the display of the popped-up icon.

In an embodiment, when a touch is sensed in the popped-up icon, the control unit may display a thumbnail image of content corresponding to the popped-up icon so as to be adjacent to the popped-up icon while maintaining the output state of the content screen displayed by the display unit.

In an embodiment, when the first touch gesture, which is continuously sensed in the display unit along with a second touch gesture in a state where a first icon is popped up onto the display unit, corresponds to the predetermined reference, the control unit may pop up a second icon, corresponding to content associated with at least one piece of information extracted from a current screen, onto another region of the display unit.

In an embodiment, in a state where the first and second icons are popped up, when a touch is sensed in the first icon, the control unit may convert the content screen, displayed by the display unit, into a screen corresponding to first content corresponding to the first icon, and perform control so that only the first icon is displayed in one region of a screen corresponding to the first content.

In an embodiment, the first touch gesture may be a pinch-out tough input, and the second touch gesture may be a pinch-in tough input.

In another aspect of the present invention, a method of controlling a mobile terminal includes: displaying at least one piece of content screen; changing an output state of the at least one content screen with respect to a point from which a first touch gesture starts, in response to that the first touch gesture is sensed in the displayed at least one content screen; sensing that the first touch gesture is continuously applied to the at least one content screen; and when the sensed first touch gesture corresponds to a predetermined reference, performing control to search for content associated with at least one piece of information extracted from the at least one content screen.

In an embodiment, the first touch gesture corresponding to the predetermined reference may be a pinch-out touch gesture which is continuously sensed in a display unit, in a state where the output state of the at least one content screen is no longer changed in response to that the pinch-out touch gesture is sensed in the at least one content screen.

In an embodiment, the changing of the output state may include: converting a current screen into a second screen which is generated by enlarging one region of the at least one content screen with respect to a start point of the first touch gesture which is sensed in the content screen; after the performing of the control to search for the content, popping up an icon, corresponding to an execution result of the search, onto one region of the displayed at least one content screen; and when a touch is sensed in the popped-up icon, converting the displayed at least one content screen into a screen corresponding to searched content corresponding to the icon.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to an embodiment of the present invention;

FIG. 3 is a flowchart of a method of controlling a mobile terminal according to an embodiment of the present invention;

DETAILED DESCRIPTION OF THE DISCLOSURE

Figure 2A:
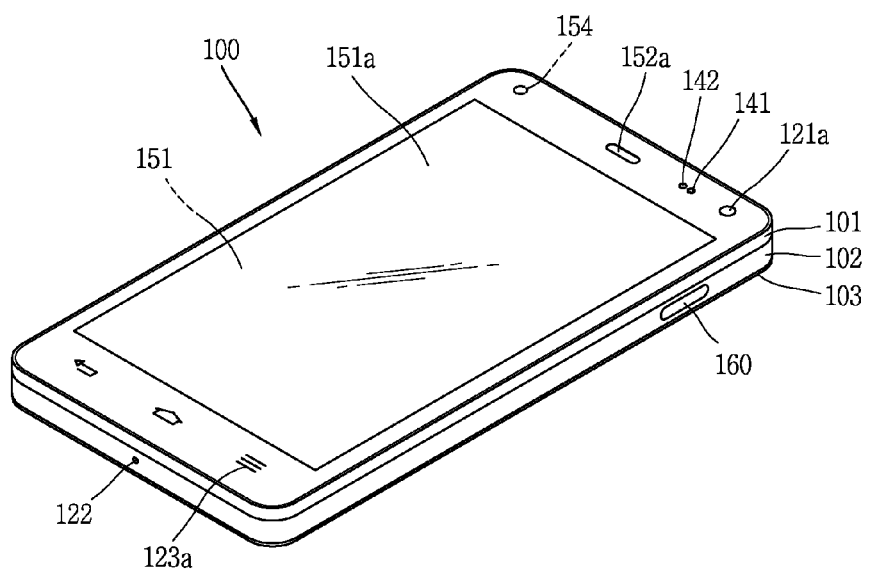
FIGS. 2A and 2B are perspective views when a mobile terminal according to an embodiment of the present invention is seen in different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, components of a mobile terminal 100 will be explained in more detail with reference to FIG. 1, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast signal may be encoded according to any of a variety of technical standards or broadcasting methods (for example, Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2B:
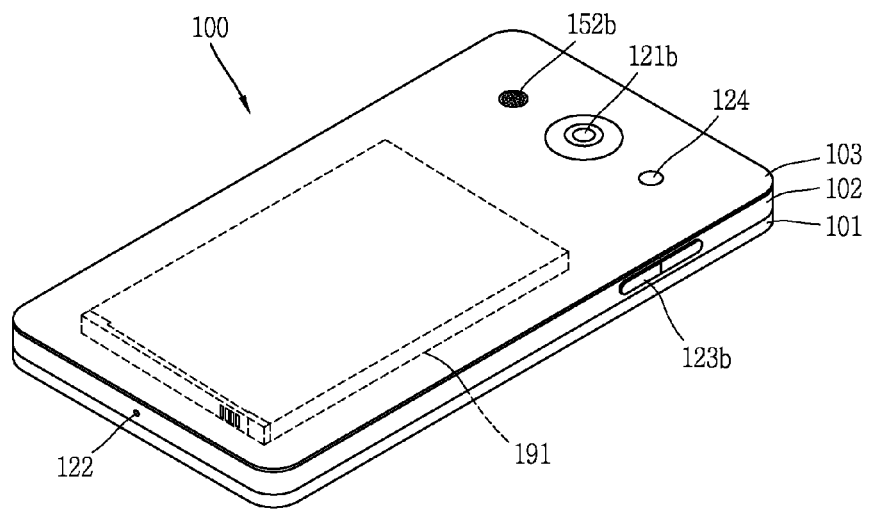
Figure 4A:
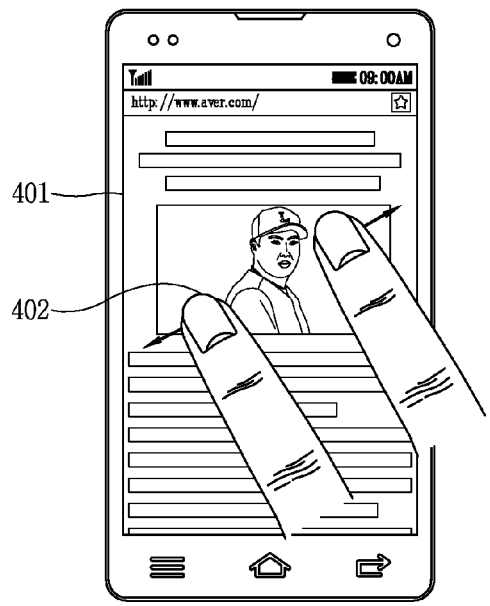
FIGS. 4(a), 4(b), 4(c), and 4(d) are exemplary conceptual diagrams for describing the flowchart of FIG. 3.
Figure 4B:
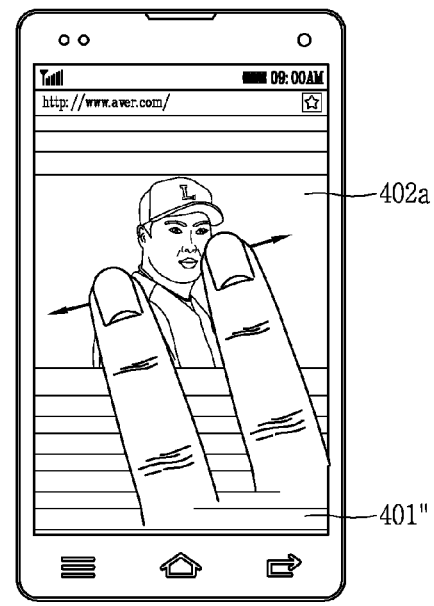
Figure 4D:
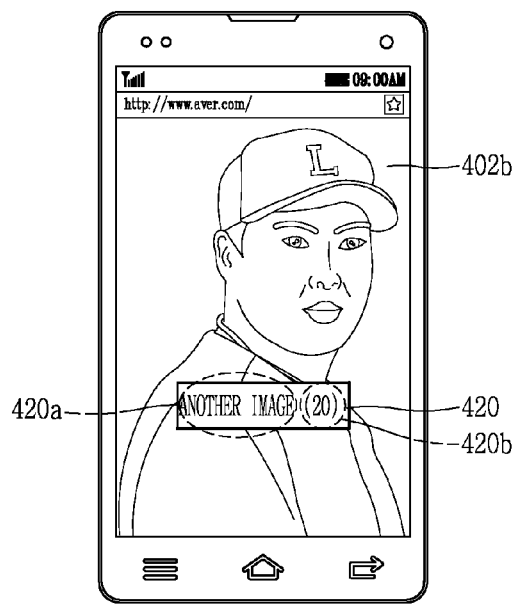
Figure 4C:
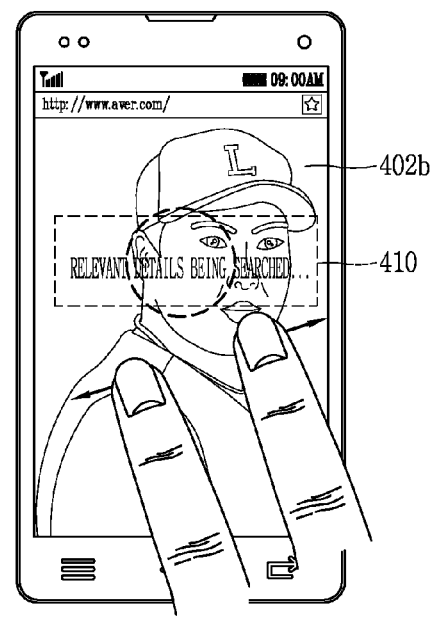
Figure 5A:
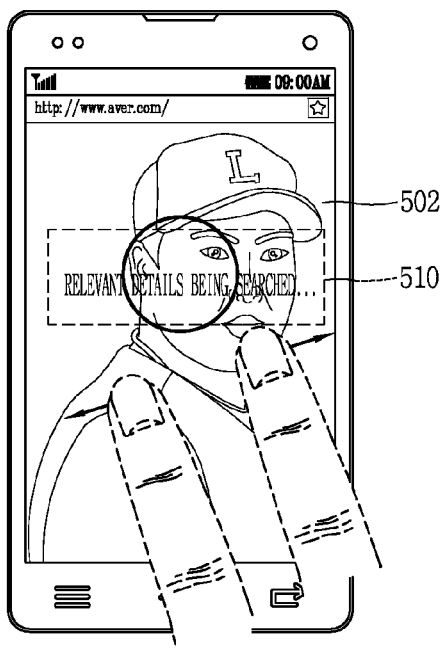
FIGS. 5(a), 5(b), 5(c), and 5(d) are exemplary conceptual diagrams for describing a method of outputting a search result of relevant information, in a mobile terminal according to an embodiment of the present invention.
Figure 5B:
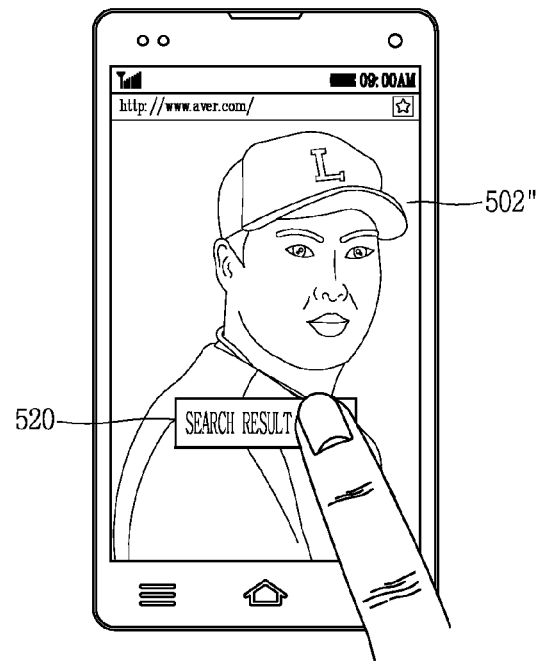
Figure 5D:
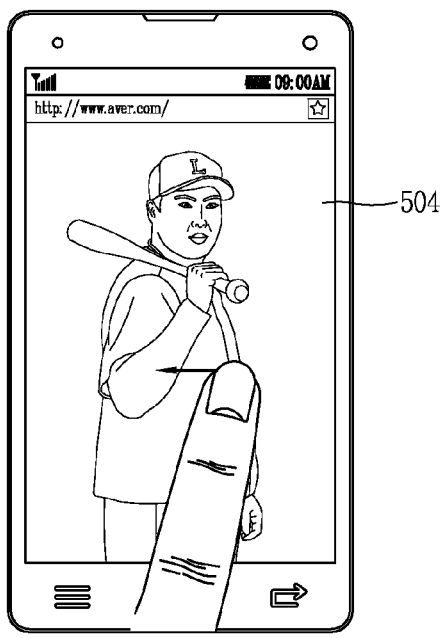
Figure 5C:
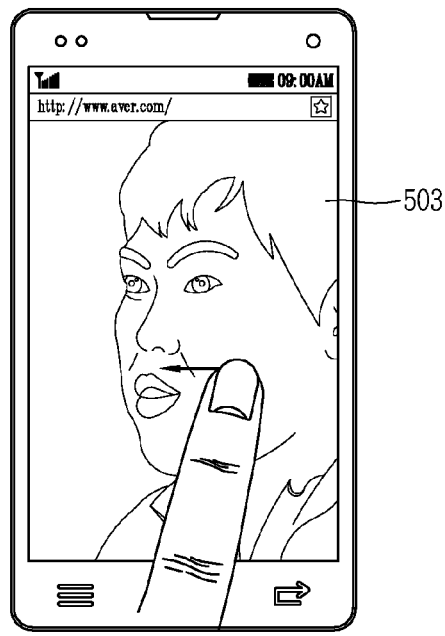

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal 100 according to an embodiment of the present invention including at least one of the above-described elements may sense that a predetermined touch gesture is continuously applied to a part, which a user desires to view in more detail, in a screen displayed by a display unit 151.

A control unit 180 may differently change an output state of the part which the user desires to view in more detail, based on the touch gesture. When the predetermined touch gesture which is continuously applied to an output screen corresponds to a predetermined reference, the control unit 180 extracts at least one piece of information from the output screen, and executes a search mode for searching for other relevant information.

Here, the predetermined reference denotes a touch gesture which is continuously applied in a state where an output state of a screen displayed by the display unit 151 is no longer changed by the predetermined touch gesture. That is, a case in which the predetermined touch gesture corresponds to the predetermined reference denotes a case in which the same touch gesture satisfies a condition where a control command for changing an output state of a screen is changed to a control command for searching for information associated with a portion of the screen.

Hereinabove, when a gesture in which a user desires to view a specific part in more detail is sensed, the mobile terminal 100 according to an embodiment of the present invention recognizes the specific part as concerns, and automatically searches for additional information associated with the specific part.

Hereinafter, a method of searching for a part which a user interestingly views by using a predetermined touch gesture will be described in detail with reference to FIGS. 3 and 4.

First, in operation S310, the mobile terminal 100 according to an embodiment of the present invention may display at least one content screen in the display unit 151.

Here, the content screen denotes a screen corresponding to execution of at least one application which is installed or downloaded. Here, the application may be expressed as an application program, and may denote all types of programs which are capable of being driven by a terminal. The application may be, for example, a program associated with a program for performing an updating function of web browser, video reproduction, schedule management, call, a game, document work, a message, a photograph, finance, an e-book, traffic information, and an application.

Moreover, a screen corresponding to execution of the application may be, for example, a webpage screen corresponding to execution of web browser, a schedule page screen, a specific page of a document, and a plurality of photograph image screens. For example, as illustrated in FIG. 4 (*a*), a specific webpage screen corresponding to execution of a web application may be displayed in the display unit 151, based on a certain input.

In operation S320, the control unit 180 may change an output state of the content screen on the basis of a point from which a first touch gesture starts, in response to that the first touch gesture is sensed in the content screen displayed by the display unit 151.

Here, the first touch gesture is a touch gesture in which a user desires to view, in detail, a specific part in the content screen displayed by the display unit 151, and for example, may be a pinch-out touch gesture. The pinch-out touch gesture may denote a gesture in which a plurality of touches, which are simultaneously applied to a plurality of points, are dragged in a direction deviating from each other. However, the present embodiment is not limited to the touch gesture. For example, the touch gesture may be replaced by another kind of touch gesture (for example, a double touch gesture) that matches a user's intention which desires to view a specific part of a screen in detail.

Moreover, an output state of a content screen being changed may denote that an output range of the content screen displayed by the display unit 151 is differently changed based on a touch gesture which desires to a specific part of the content screen in detail. For example, the content screen displayed by the display unit 151 may be enlarged and displayed based on a plurality of touch points from which the pinch-out touch gesture starts. Therefore, the output range of the content screen and the amount of output information are reduced.

In this case, the control unit 180 may reduce the output range of the content screen and the amount of information in proportion to a degree to which a touch gesture applied to the display unit 151 is dragged. For example, a degree to which the content screen currently displayed by the display unit 151 is enlarged may be changed in proportion to a degree to which a plurality of the pinch-out touch gestures applied to the display unit 151 deviates from each other.

Subsequently, in operation S330, the control unit 180 may sense the first touch gesture which is continuously applied to the content screen.

Here, as described above, the first touch gesture may denote a touch gesture (for example the same gesture as the pinch-out touch gesture) which desires to view a specific part of the displayed content screen in detail. In this case, a touch point of a first-applied pinch-out touch gesture may differ from a start point of a continuously applied pinch-out touch gesture.

For example, in response to that the pinch-out touch gesture is sensed in a region 402 of a webpage screen 401 displayed by the display unit 151 in FIG. 4 (*a*), a photograph image of the region 402 may be enlarged and displayed (402*a*) as illustrated in FIG. 4 (*b*). Furthermore, when the pinch-out touch gesture is continuously applied to the enlarged photograph image 402*a* again, as illustrated in FIG. 4 (*c*), the enlarged photograph image 402*a* may be enlarged to a maximum size in proportion to the applied pinch-out touch gesture (402*b*).

In operation S340, when the continuously sensed first touch gesture corresponds to a predetermined reference, the control unit 180 may perform control to search for other content associated with at least one piece of information which is extracted from the content screen displayed by the display unit 151.

That is, when the first touch gesture is continuously applied to the content screen, the control unit 180 may recognize a region, to which the first touch gesture is applied, as a region which the user desires to interestingly view, and perform an operation of automatically recommending more relevant information.

Here, the first touch gesture corresponding to the predetermined reference denotes a touch gesture which is predetermined in the content screen displayed by the display unit 151, and for example, may denote a predetermined touch gesture (for example, the pinch-out touch gesture) which is continuously sensed again in a state where the output state of the content screen is no longer changed, in response to that the pinch-out touch gesture is sensed.

When the first touch gesture is continuously sensed again in a state where the output state of the content screen is no longer changed, the control unit 180 may recognize that a command for acquiring other relevant information is input.

When the first touch gesture continuously applied to the content screen corresponds to the predetermined reference, the control unit 180 may extract at least some of visual information which is within a certain range, based on a point from which the first touch gesture starts.

Here, the extracted information may be determined based on visual information, which is output to the point from which the first touch gesture starts, or visual information which is within a dragged range.

That is, in an embodiment of the present invention, instead of that a specific keyword which the user desires to search for is recognized and selected, the mobile terminal 100 may automatically extract information, for recommending other information, associated with a part (the point from which the first touch gesture starts or the visual information which is within the dragged range) which the user interestingly views at present, to the user. Therefore, it is not required for the user to recognize the extracted information.

Moreover, the extracted information may be provided in plurality, in which case selection may be made based on pieces of information having a high similarity therebetween. To this end, the control unit 180 may calculate a similarity between pieces of extracted information, based on the predetermined reference (for example, search history information of the user or the like).

For example, when a facial image of a specific person is within the dragged range on the basis of the point from which the first touch gesture starts, the control unit 180 may execute a face recognizing function to extract the facial image of the specific person. Also, for example, when a plurality of texts are within the dragged range on the basis of the point from which the first touch gesture starts, the control unit 180 may extract at least one text as a keyword, based on a predetermined priority. Here, the predetermined priority may be determined based on the number of times texts are output within the dragged range, common similar words, and a search history of the user.

Moreover, when a start point of a continuously applied first touch gesture differs from a start point of a previously applied first touch gesture, the control unit 180 may extract at least one piece of information (for example, a text, an image, a face, etc.), based on a start point of a recently applied first touch gesture.

Moreover, a search range of other content associated with the extracted at least one piece of information may be differently determined depending on the kind of an application corresponding to the content screen displayed by the display unit 151. For example, information which is extracted from a webpage screen corresponding to execution of a web application may be used to search for other relevant content through web search. Also, information which is extracted from a photograph image corresponding to execution of a gallery application may be used to search for other relevant content through a search of information which is stored in the mobile terminal 100 or a server interoperating with the mobile terminal 100.

When the first touch gesture applied to the display unit 151 corresponds to the predetermined reference, the control unit 180 may search for relevant information at a background while maintaining the output state of the content screen. While the search is being executed, the control unit 180 may display an image object (for example, a loading image), indicating that the search is being executed, to be overlapped on the content screen. In this case, the image object may have a certain transparency so as not to cover at least one portion of the content screen.

As illustrated in FIG. 4(*a*), when the pinch-out touch gesture is again sensed in the photograph image 402*b* enlarged to a maximum size, an output state of the enlarged photograph image 402*b* may be maintained as-is, and the control unit 180 may enter a search mode. Therefore, the face recognizing function may be executed on the enlarged photograph image 402*b*, and information associated with a recognized facial image may be searched. While the search is being performed, an image object 410 (for example, a loading image) indicating that the search is being performed may be displayed in a region (for example, a center of a screen) of the display unit 151.

As illustrated in FIG. 4(*d*), an icon 420 indicating a search result may be displayed in one region of the display unit 151. Category (for example, an image) information 420*a* corresponding to the search result and information 420*b* about the number of other searched content may be displayed in the icon 420. In this case, a display state of the enlarged photograph image 402*b* which is displayed by the display unit 151 may be maintained as-is. That is, the icon 420 indicating the search result may be popped up onto the enlarged photograph image 402*b*.

When an interval at which predetermined touch gestures (for example, pinch-out touch gestures) applied to the display unit 151 is short, the control unit 180 may enter the search mode in a state where the output state of the content screen displayed by the display unit 151 is not changed. That is, the above-described operation (S320) may be omitted, and the operations (S330 and S340) subsequent thereto may be performed.

Moreover, even when the content screen displayed by the display unit 151 has an attribute which is not enlarged, the above-described operation (S320) may be omitted, and the operations (S330 and S340) subsequent thereto may be performed. Even in this case, however, it may be assumed that the predetermined touch gesture is continuously performed (i.e., a touch gesture is performed at least two times or more).

As described above, according to embodiments of the present invention, when a predetermined user gesture is continuously applied to a part which the user desires to view in more detail in at least one content screen which is displayed, information associated with a corresponding part may be searched. Therefore, separate manipulation for searching for relevant information is not needed, and moreover, information is more naturally, intuitively searched.

When a content screen and an icon indicating a search result are displayed on one screen, the user may be supplied with other content corresponding to the displayed icon through the screen. In this context, FIG. 5 is an example of a method of outputting a search result of relevant information, in a mobile terminal according to an embodiment of the present invention.

In a state where at least one content screen is displayed in the display unit 151, the control unit 180 may display, in the display unit 151, a second screen which is generated by enlarging the content screen with respect to a start point of a first touch gesture in proportion to that the first touch gesture (for example, a pinch-out touch gesture) is continuously sensed in the displayed content screen.

When the first touch gesture (i.e., the pinch-out touch gesture) is continuously sensed in a state where the second screen is no longer enlarged, the control unit 180 may execute a search function using at least one piece of information, included in the second screen, as a keyword. Here, the information included in the second screen may include an image and/or a text.

When the first touch gesture which is continuously sensed ends (for example, touch-up) in a state where the first touch gesture (i.e., the second screen) corresponding to a predetermined reference is no longer enlarged, the control unit 180 may pop up an icon, corresponding to a search result, onto one region of the display unit 151. Therefore, an output state of a current screen may be maintained, and a search result of relevant information may be checked in one screen.

For example, as illustrated in FIG. 5 (*a*), in a state where a specific image displayed by the display unit 151 is enlarged to a maximum size (502), when a pinch-out touch gesture is continuously applied, other content associated with the displayed specific image 502 may be searched. Furthermore, an icon 520 indicating a search result may be popped up onto one region of the display unit 151, and thus, a user may check a search result of relevant information without moving a screen.

In this case, the control unit 180 may allow at least one of attribute information and number information of at least one piece of searched content to be shown on a popped-up icon. For example, as illustrated in FIG. 5 (*b*), it can be checked through the popped-up icon 520 that twenty (520*b*) other images 520*a* have been searched as relevant information.

When a touch is applied to the popped-up icon 520, detailed information of other content corresponding to a search result may be checked. That is, the control unit 180 may convert the content screen, displayed by the display unit 151, into a screen corresponding to searched first content corresponding to an icon, in response to that a touch is sensed in a popped-up icon.

As described above, in a state which is converted into the screen corresponding to the first content, the control unit 180 may sense that a drag touch input, which starts from one point of the converted screen corresponding to the first content, is applied in predetermined one direction. When a flicking touch gesture which is applied in one direction is received, the control unit 180 may convert a screen, corresponding to the first content displayed by the display unit 151, into a screen corresponding to searched second content, based on a flicking direction and speed.

For example, when the popped-up icon 520 is selected in FIG. 5 (*b*), a current screen 502" may be converted into a first image 503 corresponding to a search result as illustrated in FIG. 5 (*c*). When a touch which is dragged in one direction (for example, a direction from the right to the left) is applied to the display unit 151 in a state where the first image 503 is displayed in the display unit 151, the first image 503 may be converted into a second image 504 corresponding to a next search result. In this case, in displaying the first image 503 and the second image 504, page information corresponding to a search result may be displayed in one region of a screen, and for example, in a lower end of the screen. For example, while the first image 503 is being displayed, '1/20' indicating a first search result may be displayed in the lower end of the screen, and while the second image 504 is being displayed, '2/20' indicating a second search result may be displayed in the lower end of the screen.

Moreover, although not shown, in converting a content screen, a page turning effect may be displayed along a flicking direction. That is, while a drag touch input which starts from one point of the converted screen corresponding to the first content is being moved in predetermined one direction, the control unit 180 may perform control so that at least one portion of a screen corresponding to the searched first content and at least one portion of a screen corresponding to the searched second content are displayed together.

Moreover, while a screen corresponding to at least one of the first and second content is being displayed in the display unit 151, the control unit 180 may perform control so that a display of an icon indicating a search result is continuously maintained in one region of the screen. Therefore, the user may recognize that the screen currently displayed by the display unit 151 is a result which is obtained through a search based on specific content.

The user may cancel a search of relevant information by using the above-described predetermined touch gesture. In this context, FIGS. 6A(*a*) to 6A(*c*) and 6B(*a*) to 6B(*c*) are exemplary conceptual diagrams for describing a method of executing a search of relevant information and search cancelation, in a mobile terminal according to an embodiment of the present invention.

Figure 6A:
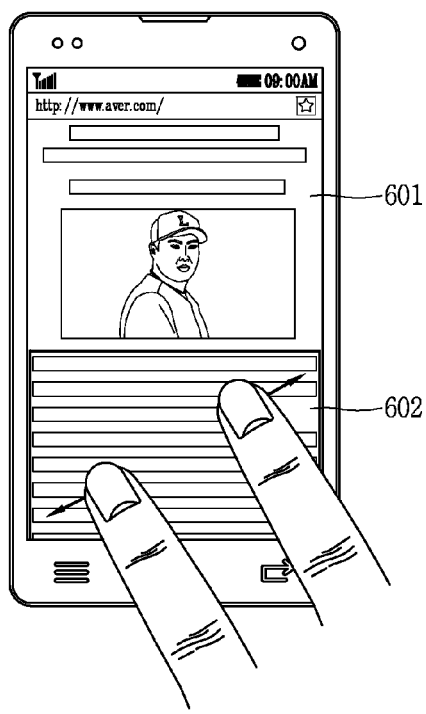
FIGS. 6A(a), 6A(b), 6A(c) and 6B(a), 6B(b), 6B(c) are exemplary conceptual diagrams for describing a method of executing a search of relevant information and search cancelation, in a mobile terminal according to an embodiment of the present invention.
Figure 6A:
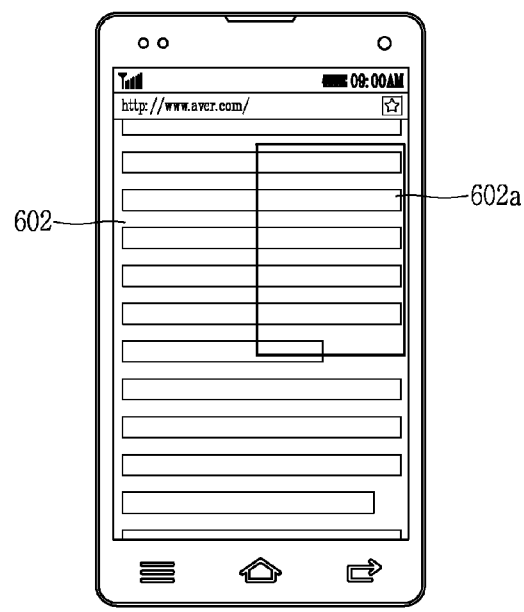
Figure 6A:
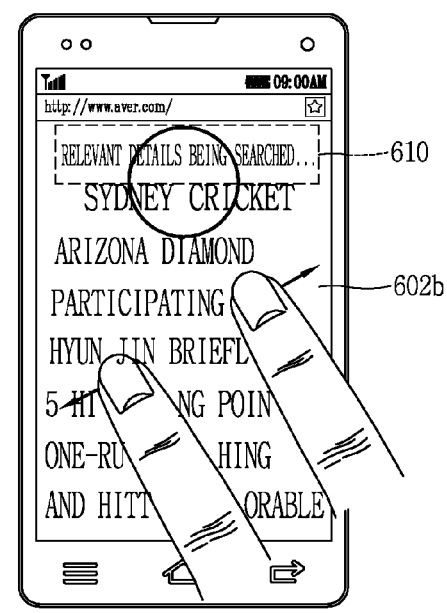

Referring to FIG. 6A (*a*) to (*c*), when a first touch gesture (for example, a pinch-out touch gesture) which is continuously sensed in the display unit 151 corresponds to a predetermined reference (i.e., when the continuously applied first touch gesture is sensed in a state where a text displayed on a screen is no longer enlarged by the first touch gesture), the control unit 180 may execute a search of relevant information in a background while maintaining, as-is, an output state of a content screen which is displayed by the display unit 151.

In this case, the control unit 180 may calculate a similarity between pieces of text information (for example, Sydney, cricket, Hyn-jin Ryu, a favorable comment, etc.) included in one region 602*a* of an enlarged screen 602, and select a final search keyword. The selected search keyword may be at least one of the pieces of text information (for example, Sydney, cricket, Hyn-jin Ryu, a favorable comment, etc.) included in the one region 602*a*, or may be a common keyword (for example, baseball, major league, etc.) associated therefrom.

As described above, while a search is being executed in the background, an image object (for example, a loading image 610 and a text indicating that relevant details are being searched) indicating that a search is being performed may be displayed to be overlapped on a content screen. In this case, the image object may be displayed to have a certain transparency.

In a state where an image object is displayed to be overlapped in one region of a content screen, the control unit 180 may sense that a second touch gesture is applied to the display unit 151. Here, the second touch gesture is a motion which reduces an enlarged content screen, and for example, may be a pinch-in touch gesture. The pinch-in touch gesture may denote a gesture in which a plurality of touches, which are simultaneously applied to a plurality of points of the display unit 151, are dragged in a direction approaching each other.

When the touch gesture is applied, the control unit 180 may recognize that a user's interest in at least one portion of a screen displayed by the display unit 151 is released. Therefore, the control unit 180 may stop a search, and perform control so that an image object displayed by the display unit 151 disappear.

Figure 6B:
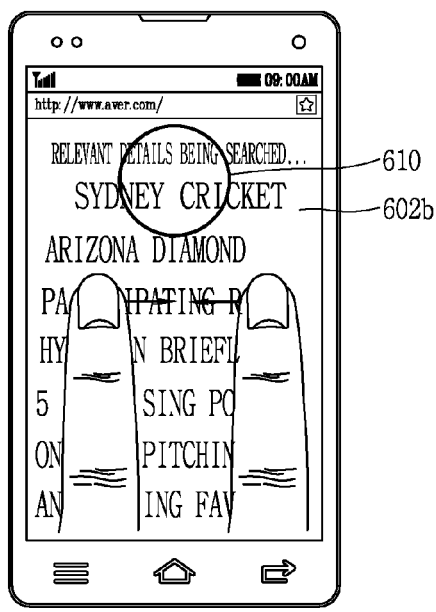
Figure 6B:
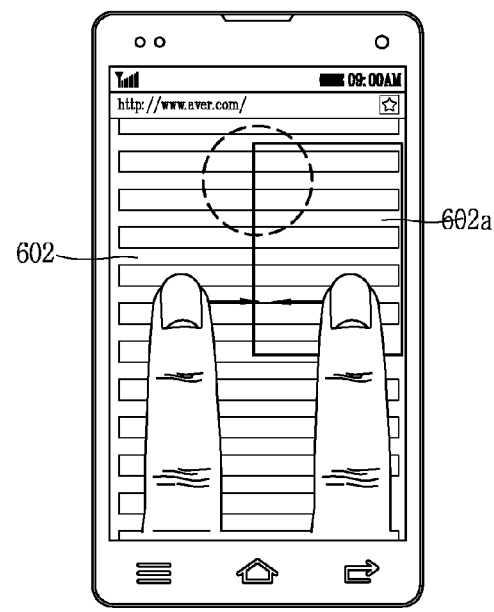
Figure 6B:
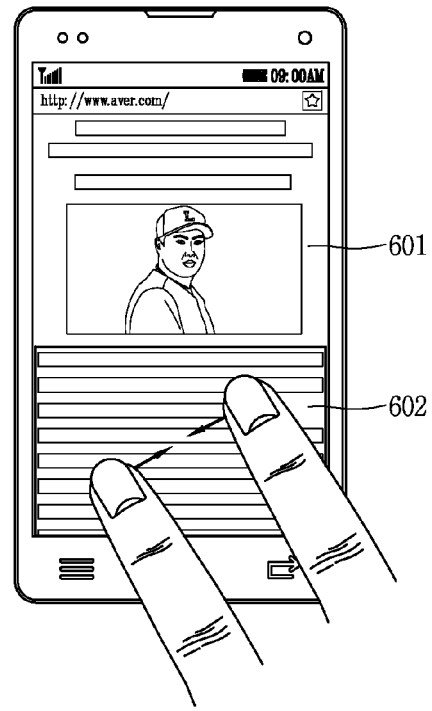

For example, while other content associated with a content screen displayed by the display unit 151 is being searched as illustrated in FIG. 6B (*a*), when a plurality of touches, which are simultaneously applied to a plurality of points of the display unit 151, are dragged in a direction approaching each other, it can be checked that as illustrated in FIG. 6B (b), a search which is being executed is stopped, and the image object 610 indicating that a search is being executed disappears. That is, the control unit 180 may recognize the pinch-in touch gesture, applied to the display unit 151, as an input of a control command which cancels a search.

In this state, when a pinch-in touch gesture is continuously sensed in the display unit 151, as illustrated in FIG. 6B (c), the content screen displayed by the display unit 151 may be changed to a reduced state (601). That is, the control unit 180 may recognize the pinch-in touch gesture, which is continuously applied to the display unit 151, as an input of a command which changes an output state, unlike a first-recognized pinch-in touch gesture.

Figure 7A:
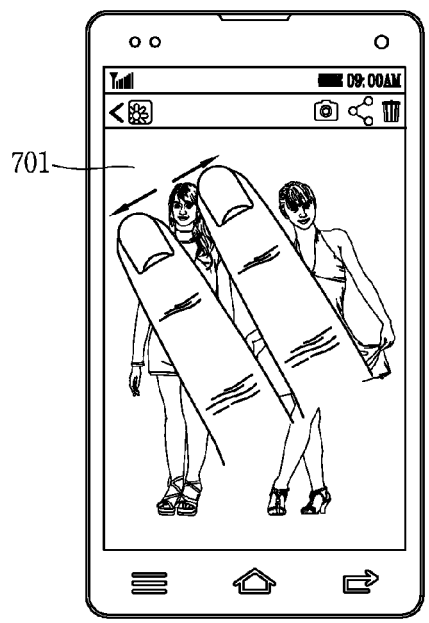
FIGS. 7A(a), 7A(b), 7A(c), and 7B(a), 7B(b), 7B(c), 7B(d) are exemplary conceptual diagrams for describing a method of displaying, by category, a search result of relevant information in a mobile terminal according to an embodiment of the present invention.
Figure 7A:
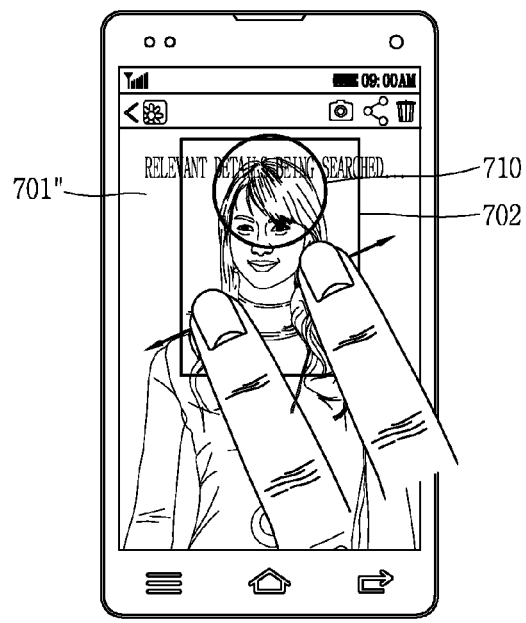
Figure 7A:
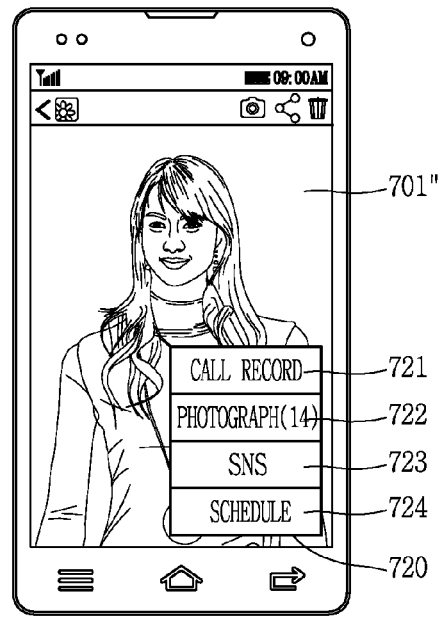
Figure 7B:
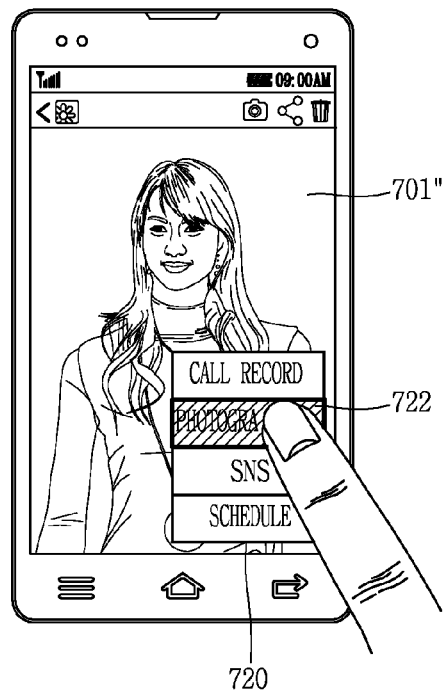
Figure 7B:
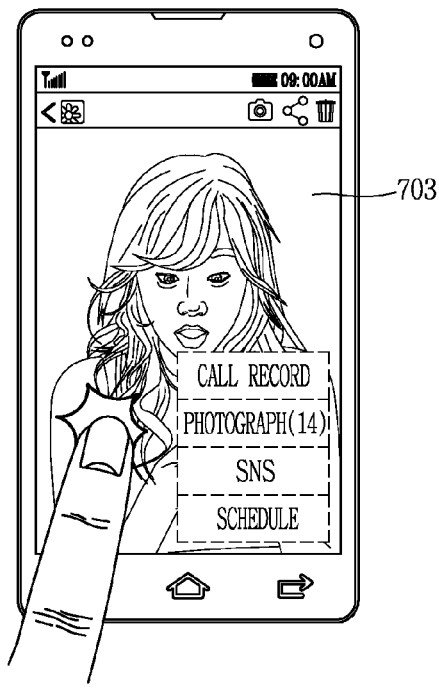
Figure 7B:
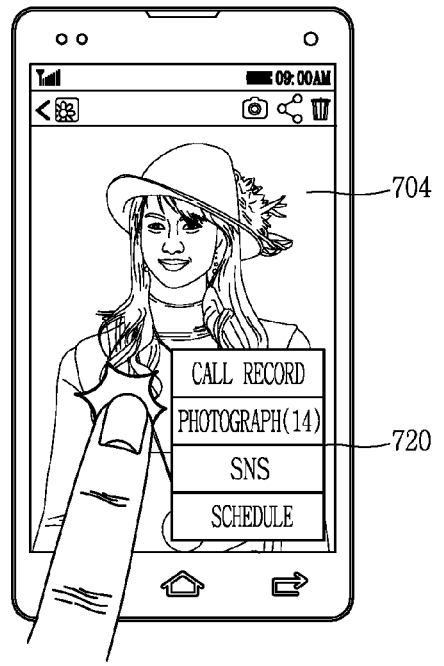
Figure 7B:
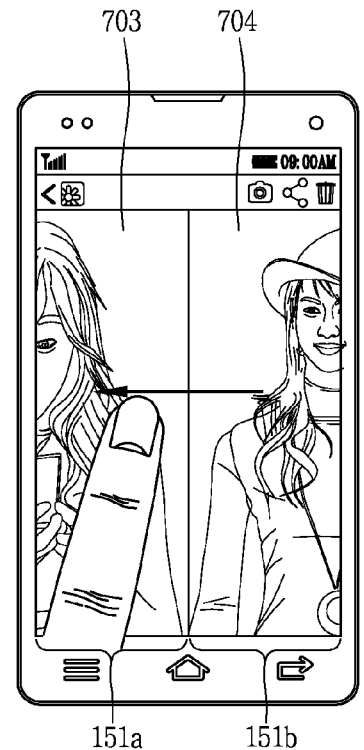

A search result of relevant information may generate a plurality of categories (for example, a plurality of other images, contact information, etc.) instead of one category (for example, a plurality of other images). FIGS. 7A and 7B are exemplary conceptual diagrams illustrating a method of displaying, by category, a search result of relevant information.

In a case where a first touch gesture (for example, a pinch-out touch gesture) which is continuously applied to the display unit 151 corresponds to a predetermined reference (i.e., a case in which the first touch gesture is continuously sensed in a state where a screen displayed by the display unit 151 is no longer changed by the first touch gesture), when a corresponding touch gesture ends, the control unit 180 may pop up an icon, corresponding to a search result of relevant information, onto one region of the display unit 151.

In this case, when a plurality of other searched content correspond to a plurality of categories, the control unit 180 may classify and display the searched plurality of content by category. As a result, different icons or different items by category may be generated. The control unit 180 may pop up the generated different icons or items onto one region of the display unit 151, or may display the generated different icons or items in the form of lists.

FIGS. 7A(a) to 7A(c) and 7B(a) to 7B(d) illustrate a case in which a plurality of content corresponding to a plurality of categories are searched based on information stored in the mobile terminal 100.

As illustrated in FIG. 7A (a), for example, a gallery application may be executed, and in a state where a specific image 701 is displayed in an entire region of the display unit 151, it may be sensed that a pinch-out touch gesture is applied to a portion (for example, a facial image of a left image) of the specific image 701. When the pinch-out touch gesture is continuously applied in a state where an enlarged facial image 702 is no longer enlarged, a face recognizing function may be executed on a facial image, and a search of other relevant content may be executed.

Therefore, a loading image indicting that a search is being executed may be displayed in one region of a screen as illustrated in FIG. 7A (b), and when the search is completed, as illustrated in FIG. 7A (c), an icon 720 indicating a search result is popped up. As a search result, pieces of information associated with the facial image 702 may be classified and displayed by the same category stored in the mobile terminal 100. For example, the popped-up icon 720, call record information 721 associated with the facial image 702, photograph image information 722, social network service (SNS) information 723, and schedule information 724 may be displayed in the form of lists classified by item.

As described above, when a plurality of content corresponding to the search result are classified into a plurality of items, the control unit 180 may control a screen so that only a plurality of content included in a selected item are displayed in the display unit 151.

For example, when photograph image information 722 is selected from the popped-up icon 720 in FIG. 7B (a), a facial image 701" displayed by the display unit 151 and another photograph image 703 including the same face may be displayed in a search order. In this case, the order in which searched images are displayed may correspond to the order in which the images are stored in the mobile terminal 100. That is, as photograph image information 722 is touched in the popped-up icon 720, a first-searched photograph image 703 may be displayed in the display unit 703, and when a flicking touch gesture is applied to the display unit 151 in one direction (for example, a direction from the right to the left), a page turning motion may be performed for a next-searched photograph image 704.

In this case, as illustrated in FIG. 7B (c), while the flicking touch gesture is being dragged in one direction, a portion of the first-searched photograph image 703 may be displayed in a first region (for example, a left region) of the display unit 151, and a portion of the next-searched photograph image 704 may be displayed in a second region (for example, a right region) of the display unit 151.

As described above, while a search result is being displayed, the display of the popped-up icon 720 may be maintained. At this time, when a predetermined touch input (for example, a short-touch input) is applied to a region deviating from the popped-up icon 720, as illustrated in FIG. 7B (b), the popped-up icon 720 may disappear from the display unit 151. Therefore, the popped-up icon 720 may not cover a portion of the searched image 703. In this state, when the predetermined touch input (for example, the short-touch input) is applied to one region of the display unit 151, as illustrated in FIG. 7B (d), the disappeared icon 720 may be displayed in the display unit 151, and thus, another searched category may be selected.

Hereinabove, a search result of information associated with a part which a user interestingly views may be checked in one screen. In a below-described embodiment, another content screen corresponding to a search result of relevant information may also be checked in one screen.

Figure 8A:
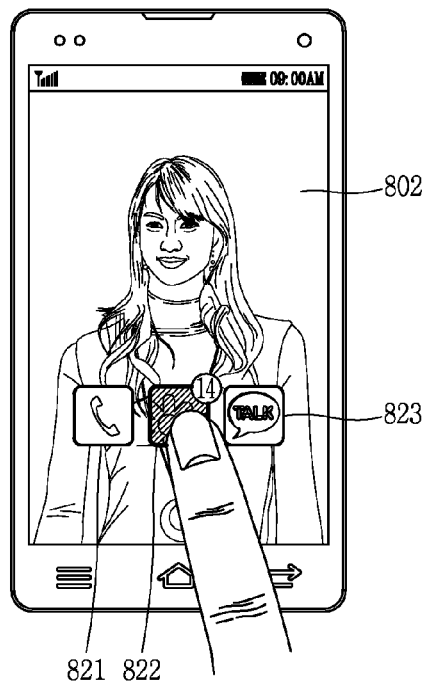
FIGS. 8A(a), 8A(b), 8A(c), 8A(d) and 8B(a), 8B(b), 8B(c), 8B(d) are exemplary conceptual diagrams for describing a method of controlling a screen by using an icon corresponding to a search result of relevant information, in a mobile terminal according to an embodiment of the present invention.
Figure 8A:
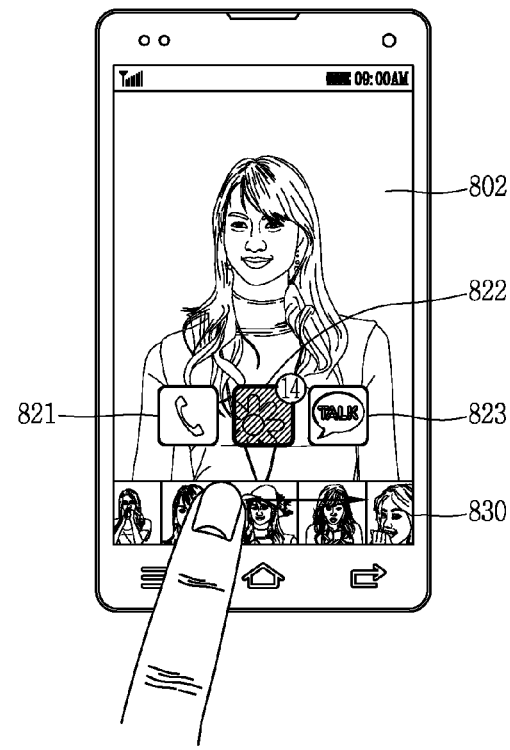
Figure 8A:
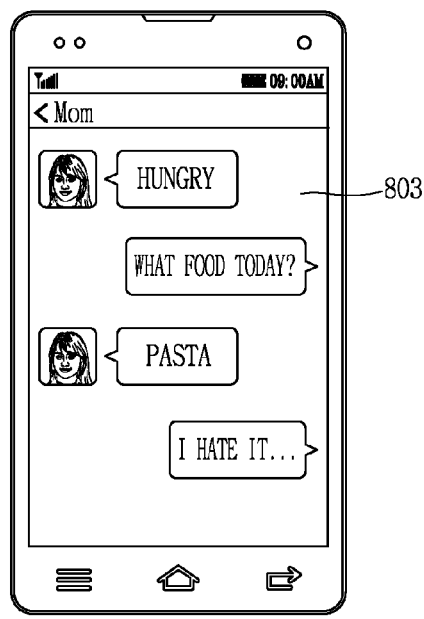
Figure 8A:
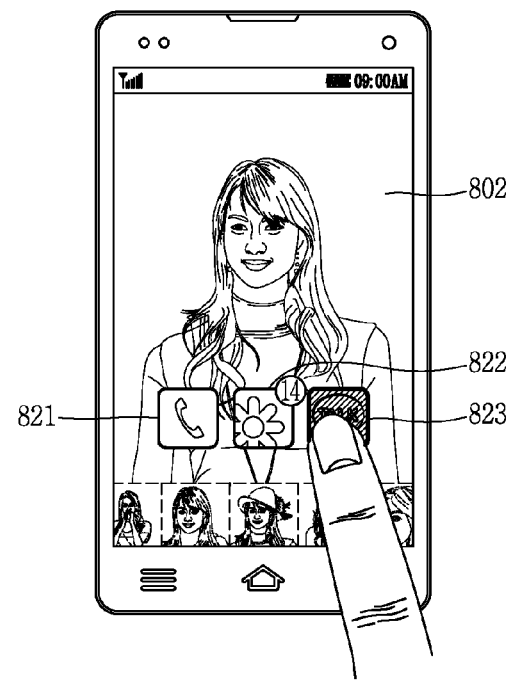

FIGS. 8A(a) to 8A(d) and 8B(a) to 8B(d) are exemplary conceptual diagrams for describing a method of controlling a screen by using an icon corresponding to a search result of relevant information, in a mobile terminal according to an embodiment of the present invention.

When a first touch gesture (i.e., a first touch gesture which is continuously applied in a state where an output state of a content screen which is displayed in the display unit 151 by the first touch gesture is no longer changed), corresponding to a reference which is predetermined in the display unit 151, being terminated is sensed, the control unit 180 may pop up an icon, corresponding to a search result, onto one region of the display unit 151.

At this time, when other content corresponding to the search result generates a plurality of categories, the control unit 180 may generate a plurality of icons corresponding to the respective categories, and pop up the plurality of icons. Also, when a touch is sensed in one of the popped-up plurality of icons, the control unit 180 may display a thumbnail image of content corresponding to the popped-up icon so as to be adjacent to the popped-up icon while maintaining an output state of a content screen displayed by the display unit 151.

For example, as illustrated in FIG. 8A(a), as a pinch-out touch gesture is applied to an enlarged facial image 802 displayed by the display unit 151, a plurality of other content associated with a recognized face may be searched, and it can be checked that a plurality of icons corresponding to a search result are displayed in one region (for example, a center of a screen) of the display unit 151. The plurality of icons may be displayed as a representative image that enables a category corresponding to the search result to be intuited. For example, a first icon 821 may include call record information associated with a recognized face, a second icon 822 may include other image information stored in a gallery application, and a third icon 823 may include SNS information associated with the recognized face. This may be intuited by viewing an image.

When a user touches the second icon 822, as illustrated in FIG. 8A (b), a selection mark (for example, an emphasis effect or a shadow effect) may appear in the second icon 822, and a thumbnail list 830 of other photograph images including the same face as a recognized face corresponding to the second icon 822 may be displayed in one region (for example, a lower end region of a screen) of the display unit 151. The user may laterally drag the displayed thumbnail list 830, and check fourteen other photograph images corresponding to a search result. In this case, when a predetermined touch input (for example, a double-short touch input or a long-touch input) is applied to a specific photograph image in the thumbnail list 830, a selected image may be displayed in an entire region of the display unit 151.

In a state the thumbnail list 830 is displayed, when the user touches another icon (for example, the third icon 823) as illustrated in FIG. 8A (c), the display of the thumbnail list 830 may be released, and as illustrated in FIG. 8A (d), a screen 803 corresponding to SNS information associated with a recognized face corresponding to the third icon 823 may be displayed the entire region of the display unit 151. In this case, the screen 803 corresponding to the SNS information associated with the recognized face may be a talk window screen which has been exchanged recently. Also, as illustrated, when the amount of information included in the screen 803 is too much to be displayed in one region of the display unit 151, a current screen 802 may be converted into the screen 803 corresponding to the SNS information associated with the recognized face. Otherwise, similarly to FIG. 8A (b), the talk window screen may be displayed in one region which is distinguished in the display unit 151.

When a pinch-in touch gesture is applied to a back key or the display unit 151 in the converted screen 803, the screen 803 may be again converted into the screen 802 which is previously displayed. For example, as illustrated in FIG. 8B (a), when the pinch-in touch gesture is applied to the converted screen 803, as illustrated in FIG. 8B (b), an enlarged facial image 802 and a plurality of icons 821 to 823 corresponding to a search result may be again displayed in the display unit 151.

In this state, when the pinch-in touch gesture is continuously applied to the display unit 151, the control unit 180 may convert the enlarged facial image 802 into a reduced photograph image 801 previous to enlargement. At this time, as illustrated in FIG. 8B (c), an icon 840 indicating searched history information may be displayed in a region, corresponding to the previously-searched facial image 802 in the reduced photograph image 801, for a predetermined time.

Figure 8B:
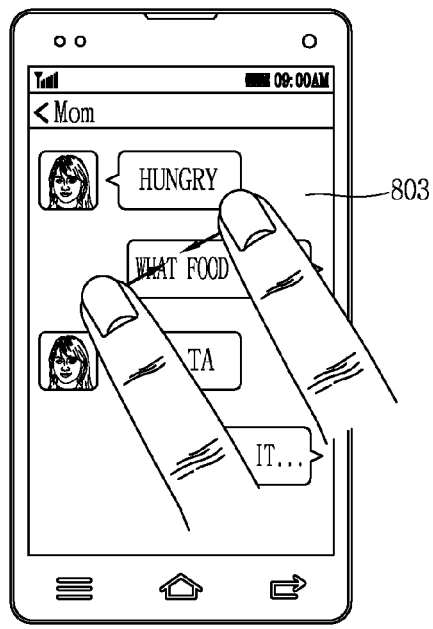
Figure 8B:
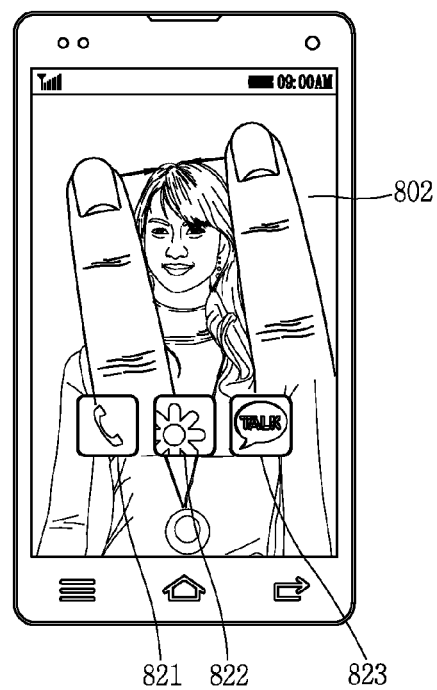
Figure 8B:
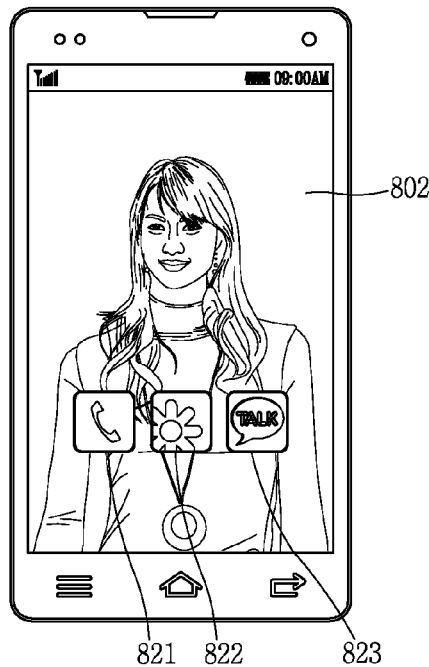
Figure 8B:
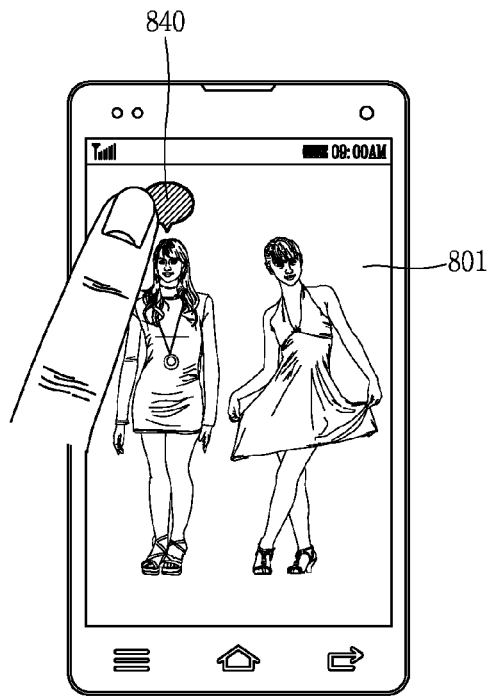

At this time, when the user touches the icon 840, as illustrated in FIG. 8B (d), the enlarged facial image 802 and the plurality of icons 821 to 823 corresponding to a search result may be immediately displayed in the display unit 151 without needing to continuously apply a pinch-out touch gesture again. Therefore, the user can quickly check the search result.

Hereinabove, a case in which the number of parts which a user interestingly views in one screen is one has been described as an example. Hereinafter, with reference to FIGS. 9A(a) to 9A(c) and 9B to 9B(d), a method will be described in which a plurality of search results are displayed on one screen by using a predetermined touch gesture when there are a plurality of parts which the user interestingly views in one screen.

Figure 9A:
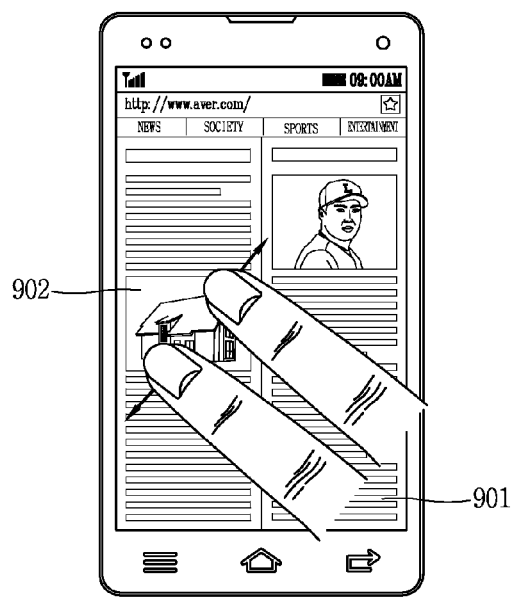
FIGS. 9A(a), 9A(b), 9A(c) and 9B(a), 9B(b), 9B(c), 9B(d) are exemplary conceptual diagrams for describing a method of displaying a plurality of search results of a plurality of parts on one screen in a content screen, in a mobile terminal according to an embodiment of the present invention.
Figure 9A:
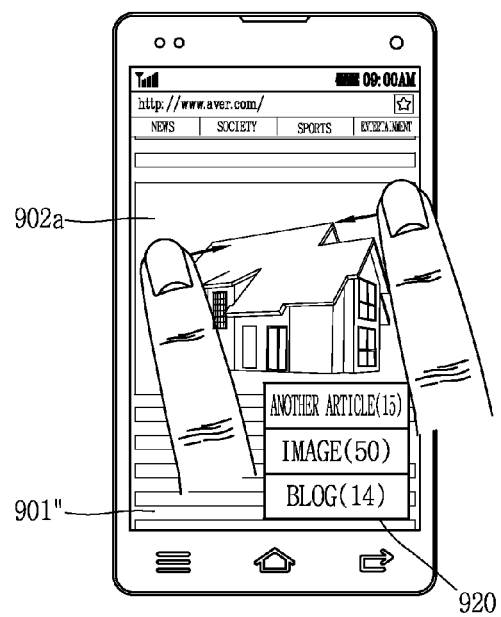
Figure 9A:
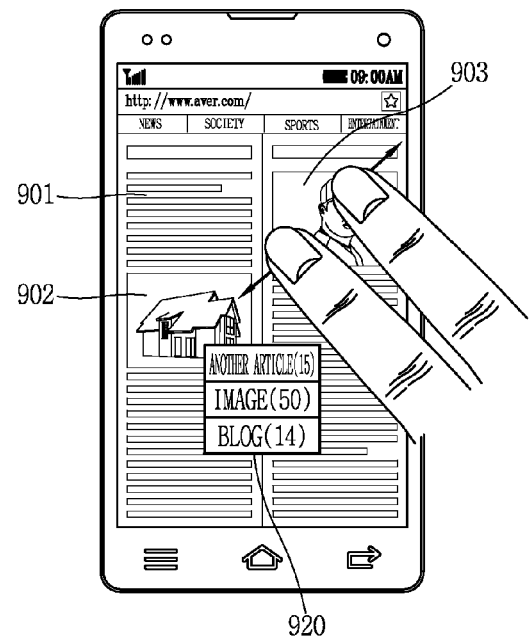

First, when a pinch-out touch gesture is continuously applied to a first region 902 of a webpage screen 901 which is displayed in the display unit 151 as illustrated in FIG. 9A (a), a first icon 920 indicating a search result of other content associated with information extracted from a first region 902a of an enlarged webpage screen 901" may be popped up onto one region of the display unit 151.

Figure 9B:
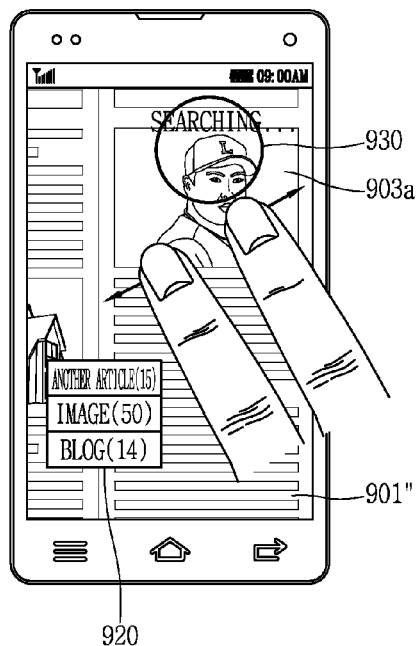
Figure 9B:
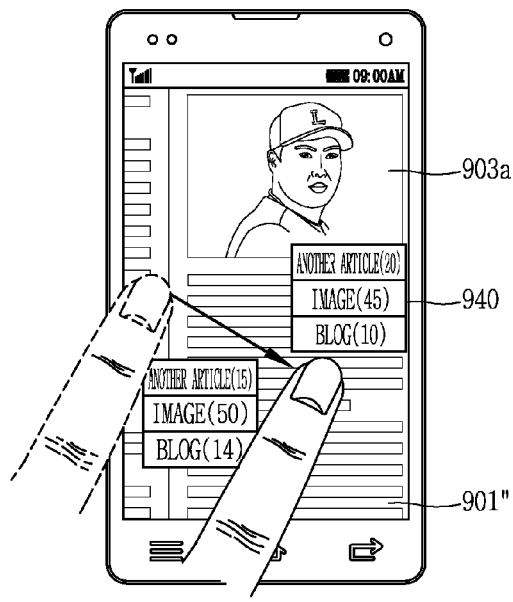
Figure 9B:
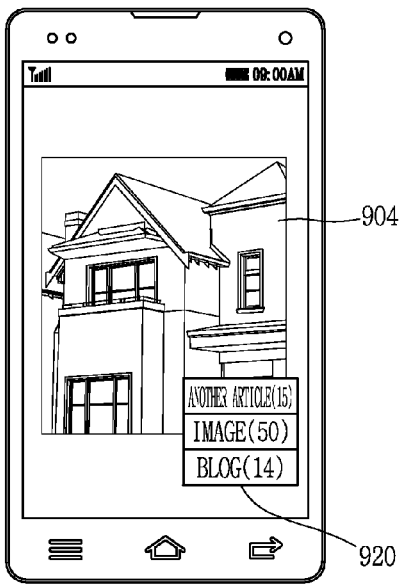
Figure 9B:
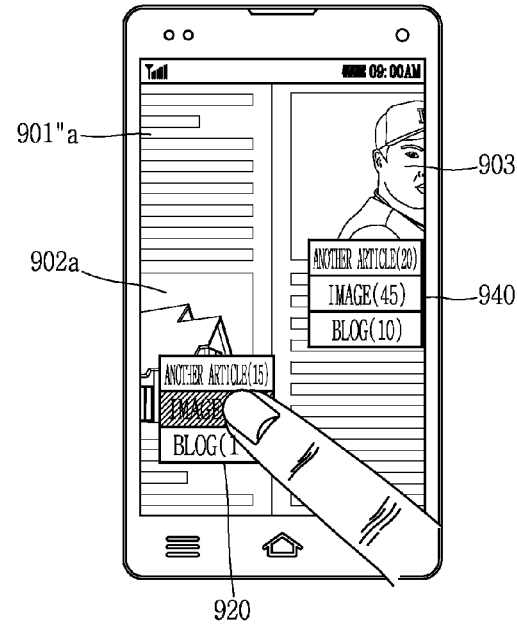

In a state the first icon 920 is popped up onto the display unit 151, when a second touch gesture (for example, a pinch-in touch gesture) is sensed in the display unit 151, as illustrated in FIG. 9A (c), the control unit 180 may again convert a current screen into a reduced webpage screen 901. Subsequently, when the pinch-out touch gesture is continuously applied to a second region 903 of the webpage screen 901 which is displayed in the display unit 151, as illustrated in FIG. 9B (a), other content associated with information extracted from a second region 903a of the enlarged webpage screen 901" may be searched (930), and thus, as illustrated in FIG. 9B (b), a second icon 940 indicating a search result may be displayed adjacent to a region (i.e., the second region 903a) which differs from a region onto which the first icon 920 is popped up. At this time, the display of the previously popped-up first icon 920 may be maintained as-is.

By using a touch and drag input in one screen, the user may laterally move the webpage screen 901" which is displayed in the display unit 151, and may check, in one screen, search results of specific regions 902 and 903a of the webpage screen 901" and corresponding regions.

In the first icon 920 and the second icon 940 are popped up onto the display unit 151, when the first icon 920 is touched, the control unit 180 may convert a content screen, which is being displayed in the display unit 151, into a screen corresponding to first content corresponding to the selected first icon 920. For example, as a touch is applied to the first icon 920 in FIG. 9B (c), as illustrated in FIG. 9B (d), another image 904 associated with information extracted from the first region 902 may be displayed in an entire region of the display unit 151. At this time, only the first icon 920 corresponding to the first content which is currently displayed may be displayed in one region of the display unit 151.

As described above, according to an embodiment of the present invention, a plurality of search results of a plurality of regions which are interesting in one screen may be checked in the one screen.

Figure 10:
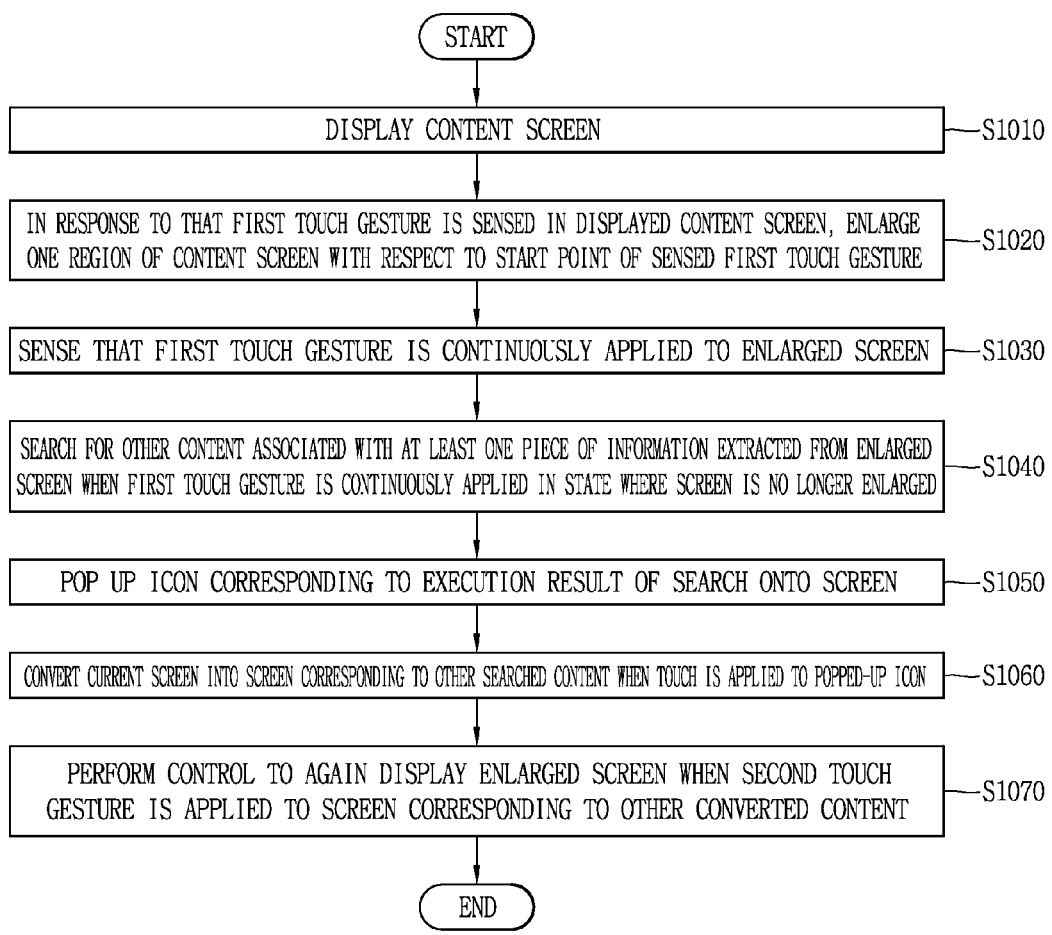
FIG. 10 is a flowchart of a method of controlling a mobile terminal according to another embodiment of the present invention.

Hereinafter, a method of controlling a screen of the mobile terminal 100 by distinguishing a part which a user interestingly views and a part from which interest is released will be described in detail with reference to FIG. 10.

First, in operation S1010, at least one content screen may be displayed in the display unit 151 of the mobile terminal 100 according to an embodiment of the present invention. Here, the content screen is a screen corresponding to execution of a specific application, and for example, may be a webpage corresponding to execution of a web application and a specific photograph image corresponding to a gallery application.

In operation S1020, when a first touch gesture (for example, a pinch-out touch gesture) is sensed in a content screen displayed by the display unit 151, the control unit 180 may enlarge one region of the content screen with respect to a point from which the first touch gesture starts. In this case, when the displayed content screen has an attribute which is not enlarged, an output state of the content screen may not be changed.

Subsequently, in operation S1030, the control unit 180 may sense that the output state is changed, or a first touch gesture is continuously applied to a maintained content screen.

In operation S1040, when a condition in which the sensed first touch gesture is continuously applied is satisfied in a state where the content screen is no longer enlarged, the control unit 180 may search for other content associated with at least one piece of information extracted from the enlarged content screen (or a content screen whose an output state is maintained from the beginning).

In this case, a range in which information is extracted may be determined based on a point from which the first touch gesture starts and a range in which the first touch gesture is dragged. For example, information may be extracted by performing different recognition functions (for example, a face recognizing function, a letter recognizing function, etc.) depending on the kind of visual information displayed at the point from which the first touch gesture starts. Also, as a degree to which the first touch gesture is dragged increases, a region or a range in which information is extracted may be broadened.

Moreover, a range in which at least one piece of extracted information and other content are searched may be determined based on a content screen displayed by the display unit 151 and the kind of an application corresponding thereto. For example, when a displayed content screen is a webpage corresponding to a web application, other content may be searched through web search, and when the displayed content screen is a specific photograph image corresponding to a gallery application, other relevant content may be searched by using information stored in the mobile terminal 100.

Subsequently, in operation S1050, the control unit 180 may pop up at least one icon, corresponding to an execution result of search, onto one region of a screen. Therefore, a user may be recommended other relevant content while looking at an interesting part in one screen.

In this case, when a touch is applied to a popped-up icon, the control unit 180 may convert a content screen, which is current displayed in the display unit 151, into a screen corresponding to other content corresponding to the icon to which the touch is applied in operation S1060.

In a state where the currently displayed content screen is converted into the screen corresponding to the other content, when a second touch gesture (for example, a pinch-in touch gesture) is applied to the display unit 151, an enlarged screen which was previously displayed may be again displayed in the display unit 151 in operation S1070.

When the second touch gesture (for example, the pinch-in touch gesture) is continuously applied to the display unit 151, the control unit 180 may recognize that the user's interest in a corresponding region is released.

In more detail, when the first touch gesture (for example, the pinch-in touch gesture) for viewing a screen displayed by the display unit 151 in more detail is continuously applied to the display unit 151, the control unit 180 may automatically recognize that the user has interestingly viewed a corresponding region, search for relevant information, and provide a search result. On the other hand, when the second touch gesture (for example, the pinch-in touch gesture) which desires to reduce a screen displayed by the display unit 151 and view the reduced screen is continuously applied to the display unit 151, the control unit 180 may recognize that the user's interest in the screen displayed in the display unit 151 is released, and convert a current screen into a screen corresponding to an upper item.

Figure 11A:
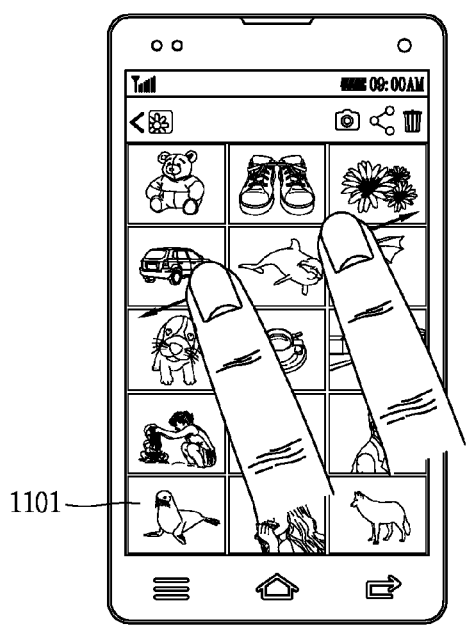
FIGS. 11A(a), 11A(b), 11A(c), and 11A(d) are exemplary conceptual diagrams for describing a method of controlling a search result of relevant information to disappear, in a mobile terminal according to an embodiment of the present invention.
Figure 11A:
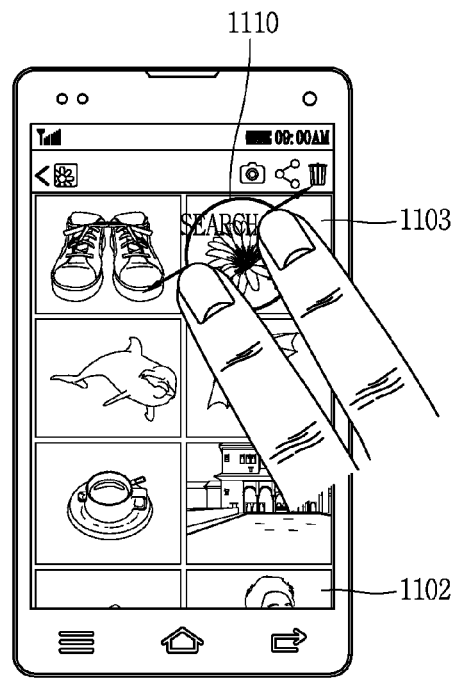
Figure 11A:
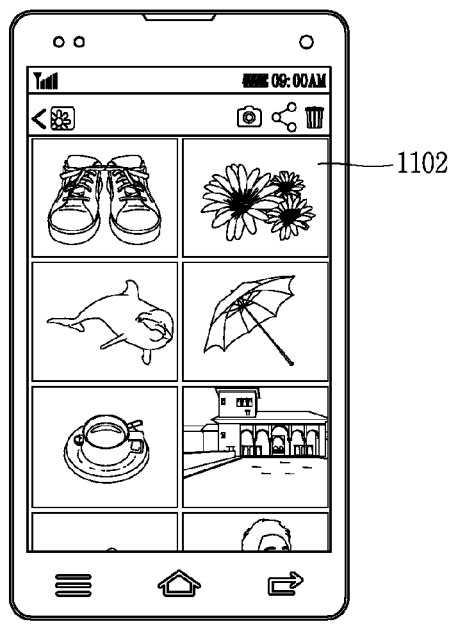
Figure 11A:
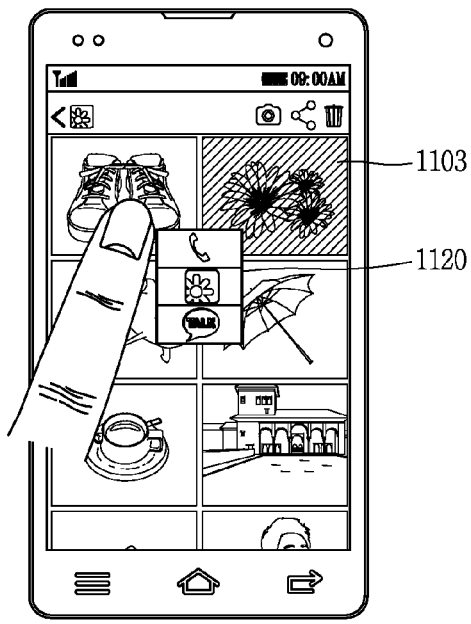
Figure 11B:
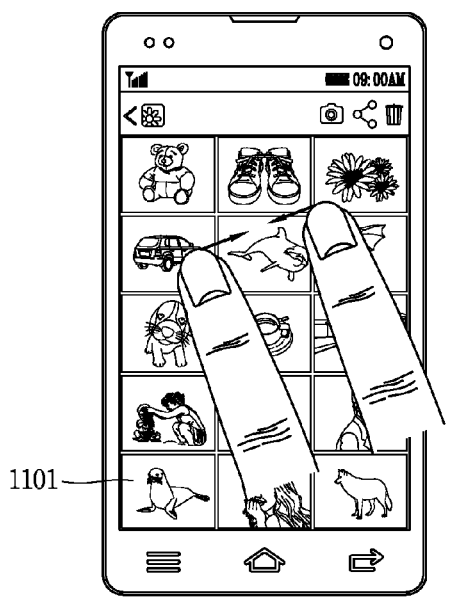
FIGS. 11B(a), 11B(b), 11B(c), and 11B(d) are exemplary conceptual diagrams for describing a method of controlling a screen by using a user gesture applied to a part from which a user's interest is released, in a mobile terminal according to an embodiment of the present invention.
Figure 11B:
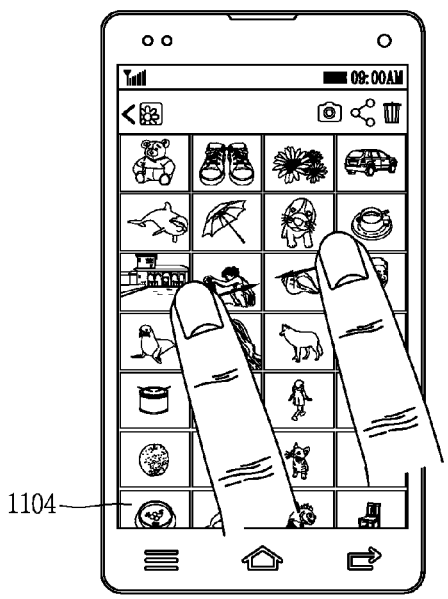
Figure 11B:
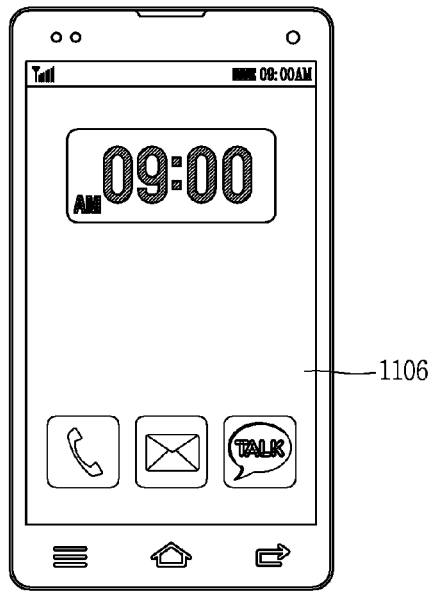
Figure 11B:
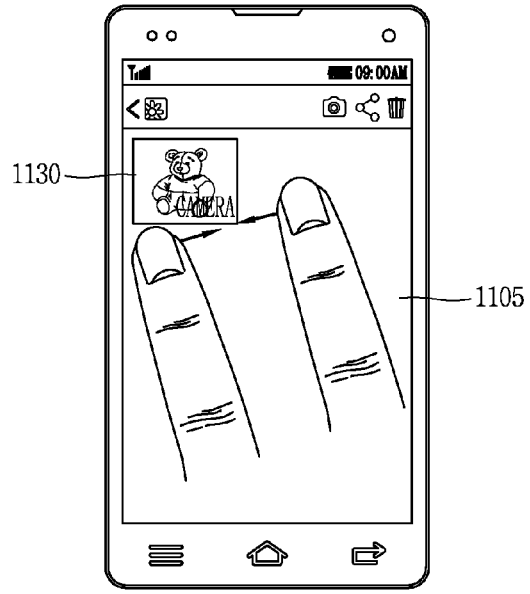

In this context, FIGS. 11B(a) to 11B(d) illustrate a method of controlling a screen of a part, from which a user's interest is released, by using a predetermined user gesture.

As illustrated in FIG. 11B (a), as a gallery application is executed, a plurality of stored images (for example, a plurality of thumbnail images) may be displayed in the display unit 151. In this case, the kinds of images capable of being displayed by the display unit 151 are not limited. For example, the images may include an image in which screen information displayed by the display unit 151 is stored (i.e., captured) as-is, an image in which only a picture or a photograph included in a webpage is stored, screen information of a reproducible video file, a picture file which is previously stored by a provider of the mobile terminal 100, a wall paper, and an image which is downloaded from another external device.

As described above, in a state where a plurality of images are displayed on one screen, when the pinch-in touch gesture is applied to the display unit 151, as illustrated in FIG. 11B (b), sizes of the plurality of images may be reduced, and thus, more images may be displayed on one screen in the display unit 151. For example, it can be checked that a plurality of images 1101 are displayed in a 3*5 array in FIG. 11B (a), and then, as the pinch-in touch gesture is applied, a plurality of images 1104 are displayed in a 4*7 array as illustrated in FIG. 11B (b).

When a plurality of images are maximally reduced according to the pinch-in touch gesture being applied, output states of a plurality of displayed images are no longer changed despite that the pinch-in touch gesture is continuously applied to the display unit 151. In this state, when the pinch-in touch gesture being applied to the display unit 151 is again sensed, the control unit 180 may recognize that there is no interest in a currently viewed screen.

Therefore, the control unit 180 may convert a screen, which is currently displayed by the display unit 151, into a screen corresponding to an upper item. For example, as the pinch-in touch gesture is continuously sensed in FIG. 11B (b), as illustrated in FIG. 11B (c), an upper folder image 1030 in which the displayed plurality of images 1104 are stored may be displayed. In this case, a folder image in which other images are classified may not be displayed in the display unit 151.

As described above, in a state where the upper folder image 1030 is displayed in the display unit 151, when the pinch-in touch gesture is again sensed, the control unit 180 may terminate a corresponding application. Therefore, as illustrated in FIG. 11B (d), an idle screen may be displayed in the display unit 151.

The above-described embodiments may be more usefully used for an execution screen of a web application. For example, a user may repeatedly read a web article having many comments or webpages having a large amount of information, and then, when the user desires to move a screen to an upper item at a specific time, the screen may be conveniently moved to the upper item by using the pinch-in touch gesture.

FIGS. 11A(a) to 11A(d) illustrate an exemplary method of controlling a screen when a user's interest is released after a search of relevant information is ended, in a mobile terminal according to an embodiment of the present invention. When the pinch-out touch gesture is sensed in a state where a plurality of images 1101 are displayed as illustrated in FIG. 11A (a), and when a predetermined touch is sensed in a region deviating from an icon-output region in a state where an icon is displayed as illustrated in FIG. 11A (b), sizes of the plurality of images 1101 may be enlarged, and thus, a plurality of images having a smaller size may be displayed on one screen in the display unit 151. For example, it can be checked that the plurality of images 1101 are displayed in a 3*5 array in FIG. 11A (a), and then, as the pinch-out touch gesture is applied, a plurality of images 1102 are displayed in a 2*3 array as illustrated in FIG. 11A (b).

When the pinch-out touch gesture is continuously applied to a specific image 1103 among the enlarged images 1102, a search function 1110 for other content associated with a corresponding image may be automatically executed. As a search result, as illustrated in FIG. 11A (c), an icon 1120 indicating a search result of other content associated with the specific image 1103 may be popped up adjacent to the specific image 1103.

At this time, when a predetermined touch (for example, a short-touch input) is sensed in a region deviating from the icon 1120, as illustrated in FIG. 11A (d), a selection mark for the specific image 1103 and a corresponding icon 1120 may disappear.

As described above, in the mobile terminal and a method of controlling the same according to the embodiments of the present invention, when a user gesture applied to a part which a user desires to view in more detail is continuously performed in at least one displayed content screen, information associated with the part is searched. Therefore, separate manipulation for searching for relevant information is not needed, and information is more naturally, intuitively searched. Also, search is performed in a background while maintaining an output state of a current content screen as-is, and thus, a search result of information associated with a part which the user interestingly views can be checked in one screen.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen; and
a controller configured to:
cause displaying of a content screen on the touch screen, the content screen comprising a specific face, object, or text;
cause the touch screen to display an enlarged content screen including the specific face, object, or text in response to a first touch gesture received via the touch screen on which the content screen is displayed, wherein the first touch gesture causes an enlarged view of the specific face, object, or text;
search for content associated with the specific face, object, or text in response to the first touch gesture when the specific face, object, or text is no longer enlarged in response to the first touch gesture;
cause the touch screen to display the enlarged content screen including the enlarged view of the specific face, object, or text with a first icon corresponding to a result of the searching;
cause the touch screen to display a reduced content screen including a reduced view of the specific face, object, or text compared to the enlarged view in response to a second touch gesture received via the touch screen on which the enlarged content screen is displayed; and
cause the touch screen to display a second icon indicating searched history information with the reduced content screen.

2. The mobile terminal of claim 1, wherein the first touch gesture is a pinch-out touch gesture that is continuously received at least for a threshold period of time when the content screen is no longer enlarged in response to the pinch-out touch gesture after the content screen is enlarged to a threshold level.

3. The mobile terminal of claim 2, wherein the searching is performed when the enlarged view of the specific face, object, or text is within a certain range with respect to a point on the touch screen from which the first touch gesture is initiated.

4. The mobile terminal of claim 1, wherein the controller is further configured to:
perform the searching in background while the enlarged content screen is displayed; and
cause displaying of an image object on the touch screen, the displayed image object overlapping the enlarged content screen and indicating that the searching is performed.

5. The mobile terminal of claim 4, wherein the controller is further configured to stop performing the searching and cause the touch screen to no longer display the image object in response to a third touch gesture received via the touch screen while the image object is displayed.

6. The mobile terminal of claim 1, wherein when the content screen comprises the specific text, the controller is further configured to search for content associated with a keyword included in the specific text.

7. The mobile terminal of claim 1, wherein the displayed first icon overlaps the enlarged content screen.

8. The mobile terminal of claim 7, wherein the displayed first icon comprises at least attribute information related to the searched content or number information indicating a number of items in the searched content.

9. The mobile terminal of claim 7, wherein:
the searched content comprises a plurality of content items corresponding to a plurality of categories; and
the displayed first icon comprises a plurality of icons such that each of the plurality of icons corresponds to one of the plurality of categories and represents at least one content item that is associated with a corresponding one of the plurality of categories.

10. The mobile terminal of claim 7, wherein the controller is further configured to cause displaying of a first screen corresponding to a first searched content item on the touch screen in response to a touch input received at the displayed first icon, the enlarged content screen replaced by the displayed first screen.

11. The mobile terminal of claim 10, wherein the controller is further configured to cause displaying of a second screen corresponding to a second searched content item on the touch screen in response to a drag touch input received at the first screen in a specific direction.

12. The mobile terminal of claim 11, wherein the controller is further configured to cause displaying of a portion of the first screen and a portion of the second screen together on the touch screen while the drag touch input is received.

13. The mobile terminal of claim 1, wherein
the controller is further configured to cause the touch screen to re-display the enlarged content screen and the first icon in response to a touch input received via the second icon.

14. The mobile terminal of claim 7, wherein:
the displayed first icon is displayed as a pop-up list including a plurality of icons;
the controller is further configured to cause displaying of at least one thumbnail image on the touch screen in response to a touch input received at one of the plurality of icons, the at least one thumbnail image corresponding to the one of the plurality of icons; and
the list and the at least one thumbnail image are displayed together overlapping the enlarged content screen.

15. The mobile terminal of claim 7, wherein the first touch gesture is a pinch-in touch gesture.

16. The mobile terminal of claim 15, wherein the second touch gesture is received immediately following the first touch gesture.

17. The mobile terminal of claim 15, wherein the second touch gesture comprises a pinch-in touch input.

18. A method for controlling a mobile terminal, the method comprising:
displaying a content screen comprising a specific face, object, or text on a touch screen;
causing the touch screen to display an enlarged content screen including the specific face, object, or text in response to a first touch gesture received via the touch screen on which the content screen is displayed, wherein the first touch gesture causes an enlarged view of the specific face, object, or text;
searching for content associated with the specific face, object, or text in response to the first touch gesture when the specific face, object, or text is no longer enlarged in response to the first touch gesture;
causing the touch screen to display the enlarged content screen including the enlarged view of the specific face, object, or text with a first icon corresponding to a result of the searching;
causing the touch screen to display a reduced content screen including a reduced view of the specific face, object, or text compared to the enlarged view in response to a second touch gesture received via the touch screen on which the enlarged content screen is displayed; and
causing the touch screen to display a second icon indicating searched history information with the reduced content screen.

19. The method of claim 18, wherein the touch gesture comprises a pinch-out or pinch-in touch gesture that is continuously received at least for a threshold period of time when the content screen is no longer enlarged in response to the pinch-out or pinch-in touch gesture after the content screen is enlarged to a threshold level.

20. The method of claim 19, further comprising:
enlarging the specific face, object, or text included in the content screen according to the pinch-out or pinch-in touch gesture;
displaying the first icon on the touch screen such that the first icon overlaps the enlarged content screen including the enlarged view of the specific face, object, or text; and
displaying a screen corresponding to a searched content item on the touch screen in response to a touch input received at the displayed first icon, the enlarged content screen replaced by the displayed screen corresponding to the searched content item.

* * * * *